United States Patent [19]

Croydon

[11] 4,330,229

[45] May 18, 1982

[54] DRILL BIT

[75] Inventor: Frederic G. Croydon, Portland, Oreg.

[73] Assignee: Omark Industries, Inc., Portland, Oreg.

[21] Appl. No.: 212,896

[22] Filed: Dec. 4, 1980

[51] Int. Cl.³ .................................................. B23B 51/00
[52] U.S. Cl. ...................................... 408/212; 408/214; 408/230
[58] Field of Search ............... 408/211, 212, 213, 214, 408/223, 224, 225, 229, 230

[56] References Cited

U.S. PATENT DOCUMENTS

| 72,065 | 12/1867 | McGee | 408/213 |
| 298,786 | 5/1884 | Shaler | 408/213 |
| 413,972 | 10/1889 | Shaler | 408/212 |
| 2,230,645 | 2/1941 | Jones | 408/212 |

Primary Examiner—Harrison L. Hinson

[57] ABSTRACT

A drill bit having a generally cylindrical body with a working end and flutes extending along the body. The working end is formed with a central work-engaging point and a pair of slitting spurs spaced outwardly from the point adjacent edge margins of the body. Convexly contoured portions interconnect the point and spurs to permit sharpening with a round file.

5 Claims, 4 Drawing Figures

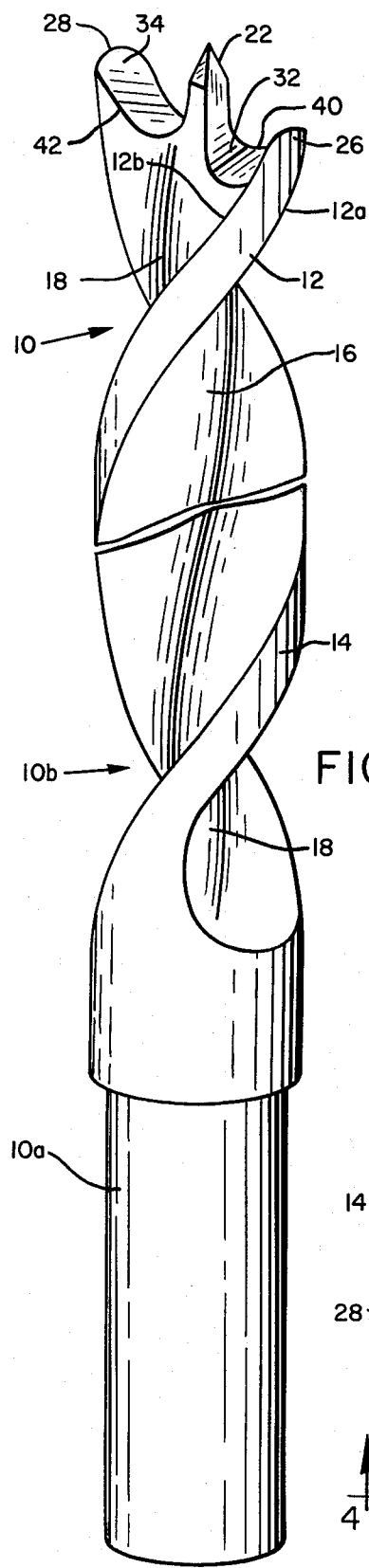
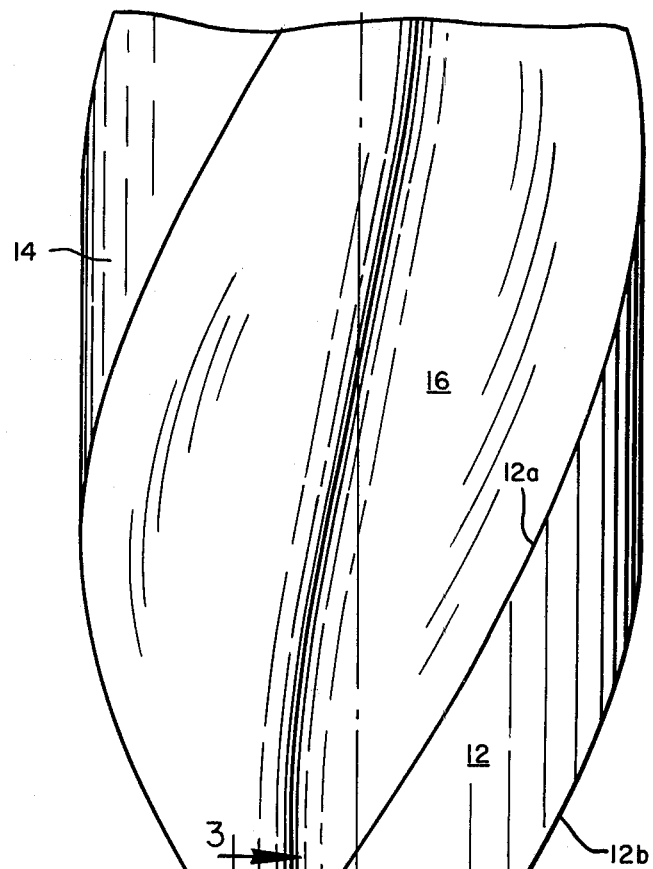
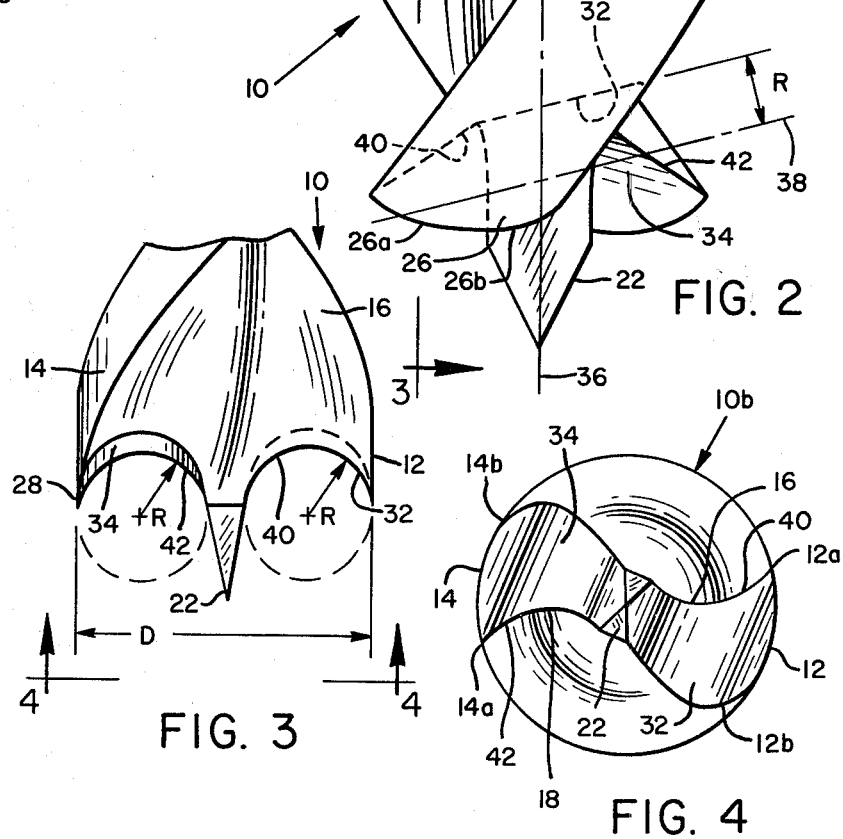
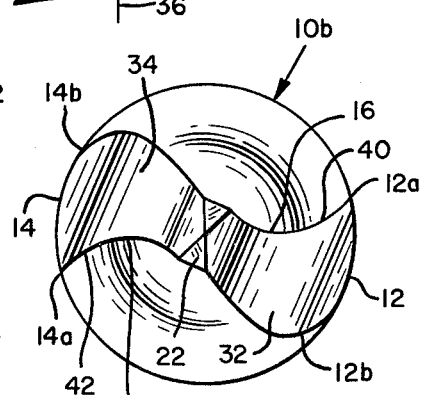
FIG. 1
FIG. 2
FIG. 3
FIG. 4

DRILL BIT

BACKGROUND AND SUMMARY OF THE INVENTION

This invention relates to a drill bit having slitting spurs spaced radially outwardly from a central point with convexly contoured portions therebetween which permit sharpening with a round file.

Helically fluted drill bits having a central point and spurs spaced radially outwardly therefrom are known. Such drill bits are illustrated in prior U.S. Pat. Nos. 421,293 to Loftie; 2,613,710 to Emmons; 3,824,026 to Gaskins; and French Pat. No. 944,587. However, none of the above appear to combine the features of a drill bit including a fluted, generally cylindrical body having a working end with a central work-engaging point, at least a pair of slitting spurs spaced radially outwardly therefrom, and a convexly contoured body portion interconnecting the point and a spur and intersecting a fluted region, with a spur having a sharpened slitting edge with an arcuate leading portion which first engages the work on rotation of the body. The intersection between the flute and the convexly contoured portion defines a sharp cutting edge. A drill bit according to the present invention provides the advantages of cleanly slitting the material to be bored and being able to be sharpened with a round file which is laid in and drawn across the convexly contoured portion interconnecting the central point and a spur.

A general object of the present invention is to provide a novel drill bit having the construction generally as set out above, and producing the stated advantages.

More specifically an object is to provide a novel drill bit having slitting spurs with arcuate leading edges able to cleanly engage and slit material at the periphery of a hole to produce a clean bore in the material.

A still further object of the present invention is to provide such a novel drill bit in which convexly contoured portions between the point and spur intersect the flutes in the body of the bit permitting sharpening with a round file.

DRAWINGS

These and other objects and advantages will become more fully apparent as the following description is read in conjunction with the drawings wherein:

FIG. 1 is a perspective view of a drill bit constructed according to an embodiment of the invention;

FIG. 2 is an enlarged inverted side elevation view of the working end of the drill bit of FIG. 1;

FIG. 3 is a side elevation view of the working end of the drill taken along the line 3—3 in FIG. 2, but on a smaller scale; and FIG. 4 is a cross section view taken generally along the line 4—4 in FIG. 3.

DESCRIPTION OF PREFERRED EMBODIMENT

At 10 is indicated generally a drill bit constructed according to a preferred embodiment of the invention. It has a substantially cylindrical shank, or rear end, portion 10a and a fluted forward working portion 10b.

The working portion of the body has helical marginal edge portions 12, 14, also referred to herein as margins. As is best seen in FIG. 4, margins 12, 14 occupy and form portions of a cylindrical surface and have leading edges 12a, 14a and trailing edges 12b, 14b respectively. Helical flutes 16, 18 are defined between margins 12, 14.

As is illustrated in FIG. 4, the cross section of working portion 10b of the drill is formed in a relatively thin S-shaped configuration to provide substantial open areas within a bore for improved chip removal during operation. Additionally, it will be recognized that no clearance grind has been made on margins 12, 14. This increases the margin width to aid in producing straight drilling with minimal drifting.

Referring now to FIGS. 2 and 3, the forward end of the drill bit is referred to herein as its working end. A central work engaging point 22 is provided at the working end for initially penetrating the material to be bored and acts as a guide during drilling.

Arcuate slitting spurs 26, 28 are provided at the working end of margins 12, 14 respectively. As is seen in FIG. 2, spur 26 is aligned longitudinally of the drill body with, and defines an extension of, its associated margin 12.

The arcuate configuration of the spur is such that its leading edge portion 26a which first engages the work on rotation of the drill slopes toward the opposite, or shank, end of the body on progressing in the direction of rotation of the drill. The drill illustrated is adapted for working rotation in a clockwise direction as viewed from the shank toward the point end of the drill. The curvature of the slitting spur is such that its apex, or portion positioned farthest forward on the drill, and indicated generally at 26b, is positioned closer to trailing edge 12b then to leading edge 12a of its associated margin.

Convexly contoured body portions 32, 34 extend between and interconnect point 22 of the drill and slitting spurs 26, 28, respectively. Each convex portion is formed with a radius "R" which is in range of 0.15 to 0.23 of the diameter "D" of the drill body. As is best seen in FIG. 2, each convex connecting portion, such as 32, is disposed at an angle relative to a plane occupied by the longitudinal center line 36 for the drill. A center of curvature for convex portion 32 is indicated generally by line 38, disposed at an angle relative to a plane occupied by the longitudinal center line 36 of the drill body. The angle "Y" between line 38 and the plane occupied by center line 36 is in a range of 60° to 80°. The convexly contoured portion 32 intersects flute 16 to provide a sharp cutting edge at 40. The intersection between portion 34 and flute 18 defines a cutting edge 42.

Due to the convex curvature of portions 32, 34, it is possible to sharpen the drill bit using a round file. The user may simply lay a round file into convexly contoured portions 32, 34 at the appropriate angle and by drawing the file through these regions, the slitting spurs and the forwardly directed cutting edges 40, 42 are sharpened.

A drill bit thus constructed has the advantages of providing slitting spurs adjacent marginal edge portions thereof which provide a slicing or slitting action to provide an initial cut at the margin of a bore. This aids in removal of material from the bore and provides a smooth bore on completion.

The open flute configuration maximizes chip removal characteristics, and the lack of clearance grind on the peripheral margins of the bit aids in producing straight drilling with minimal tendency to drift.

The sharpened point aids in guiding the drill bit and the convexly contoured portions interconnecting the point and the slitting spurs provide leading cutting edges which are easily sharpened by the use of a round file.

It should be recognized that variations and modifications may be made without departing from the spirit of the invention as set out in the following claims.

I claim:

1. A drill bit comprising an elongate body having a working end and helical flutes formed therein extending from said working end toward the opposite end of said body, said working end being formed with a central work-engaging point, at least a pair of slitting spurs spaced radially outwardly from said point adjacent outer edge margins of said body, and a convexly contoured body portion interconnecting said point and a spur and intersecting a flute in said body to define a sharpened cutting edge intermediate said point and spur, a spur having a sharpened arcuate slitting edge directed longitudinally outwardly from said body in the same direction as said point with a leading portion of said slitting edge which first engages the work on rotation of the drill sloping toward the opposite end of said body on progressing in the direction of rotation.

2. The drill bit of claim 1, wherein said body has a helical margin portion at the periphery thereof with leading and trailing edges, said spur defines an extension of said margin portion extending longitudinally of said body, and the apex of said spur is positioned closer to said trailing edge than to said leading edge.

3. The drill bit of claim 1, wherein said convexly contoured body portion has a radius in a range of 0.15 to 0.23 of the diameter of said body.

4. The drill bit of claim 3, wherein the center of curvature of said convexly contoured body portion is a line disposed at an angle in a range of 60° to 80° relative to a plane occupied by the longitudinal center line of said body.

5. The drill bit of claim 1, wherein a spur is aligned longitudinally of the body with and defines an extension of a marginal non-fluted peripheral portion of said body.

* * * * *